United States Patent [19]
Marcus

[11] 3,842,812
[45] Oct. 22, 1974

[54] FOUR-CYCLE INTERNAL COMBUSTION ENGINE WITHOUT A CAMSHAFT

[76] Inventor: Ernst Marcus, Casilla 258, La Paz, Bolivia

[22] Filed: Oct. 16, 1972

[21] Appl. No.: 297,928

[52] U.S. Cl. ........ 123/75 RC, 123/75 R, 123/90.14
[51] Int. Cl. ............................ F01l 9/02, F01l 25/06
[58] Field of Search........ 123/90.14, 75 RC, 75 CC, 123/73 R, 74 R, 73 AB, 75 R

[56] References Cited
UNITED STATES PATENTS

| | | | |
|---|---|---|---|
| 634,509 | 10/1899 | Sturtevant...................... | 123/118 X |
| 877,834 | 1/1908 | Daniel............................ | 123/73 AB |
| 896,439 | 8/1908 | Criner............................. | 123/90.14 |
| 955,786 | 4/1910 | Frear .............................. | 123/90.14 |
| 1,289,058 | 12/1918 | Spohrer ....................... | 123/90.14 X |
| 1,323,445 | 12/1919 | Boyce ............................ | 123/79 |
| R13,099 | 4/1910 | McVicker...................... | 123/90.14 |

Primary Examiner—Manuel A. Antonakas
Assistant Examiner—W. Rutledge, Jr.
Attorney, Agent, or Firm—Allen D. Brufsky

[57] ABSTRACT

A four-cycle internal combustion engine having an intake and exhaust valve which operate in response to gas pressure generated in the engine cylinder during the operating cycle of the engine, rather than by external cams mounted on a camshaft. Pressure responsive control valves mounted on the cylinder admit fresh charges of air and fuel beneath the piston in the cylinder during its compression and exhaust strokes and the piston pumps these fresh charges back into the cylinder above the piston through the intake valve during the intake stroke, resulting in twice the air charge of a conventional engine. At the end of the power stroke another pressure responsive valve opens to relieve the pressure generated in the cylinder after ignition, to enable gas pressure previously generated in an air chamber above the cylinder and acting on the exhaust valve to open it to expel the burnt charge. The exhaust passage of the engine is also located so as to place the burnt gases in heat exchange relation with the fresh charge to preheat the charge, increasing the thermal efficiency of the engine.

5 Claims, 7 Drawing Figures

FOUR-CYCLE INTERNAL COMBUSTION ENGINE WITHOUT A CAMSHAFT

BACKGROUND OF THE INVENTION

1. Field of the Invention

This invention relates to a four-cycle internal combustion engine, and more particularly, a four-cycle internal combustion engine without a camshaft for operating the intake and exhaust valves of the engine.

2. Description of the Prior Art

A conventional, spark-ignition internal combustion engine is usually operated on the four-cycle or "Otto" principle. The four-cycle engine requires four strokes of the piston per two revolutions of the crankshaft to complete the following cycle(:) (1) intake, (2) compression, (3) power, and (4) exhaust.

During the intake stroke, an intake valve is opened admitting a new charge of fuel and air into a cylinder of the engine. The intake valve remains closed during the remainder of the cycle. The fresh charge of fuel and air is compressed on the upstroke of the piston after intake. A spark ignites the compressed mixture during the power stroke driving the piston downwardly in its cylinder. During the next upward stroke of the piston, the burnt exhaust gases are expelled through an exhaust valve which is opened only on the exhaust stroke. The cycle is then repeated and fresh charge is introduced through the intake valve during the next downward stroke of the piston.

Another common type of internal combustion engine in use today depends on compression-ignition, rather than spark-ignition, and operates on the well-known "Diesel" principle. The compression-ignition engine (1) takes only air into the cylinder on the intake stroke in place of fuel and air, (2) uses compression ratios of about 15 to 1 instead of 7 to 1, thereby producing compression temperatures above the auto-ignition temperature of the fuel, (3) has fuel injected into the cylinder at approximately the same time in the cycle that the spark occurs in a spark-ignition engine, and (4) uses no carburetor or ignition system.

The four-cycle compression-ignition engine employs the conventional four-strokes per cycle of intake, compression, power, and exhaust. The air inducted on the intake stroke is either normally asperated or forced in by a supercharger while the fuel is injected into the cylinder near the end of the compression stroke. Near the end of the compression stroke, fuel is sprayed into the combustion chamber at pressures varying from about 1,200 to over 30,000 psi.

Both the spark-ignition engine and the compression-ignition engine utilize intake and exhaust valves which are opened and closed, respectively, by cams mounted on a camshaft operated from the engine crankshaft or from any other moving part of the engine. The cams are in contact with stems on the valves for opening and closing them in proper sequence during the four-cycle operation.

The engine design of the present invention dispenses with the necessity of providing a camshaft, cams, or mechanism of any kind whatsoever for operating the valves.

The proposition of eliminating the camshaft, cams and its associated gearing in a four-cycle internal combustion engine has been advanced heretofore. For example, in U.S. Pat. No. 955,786, dated Apr. 19, 1910, the inlet and exhaust valves in a four-cycle internal combustion engine are connected with auxiliary pistons mounted in auxiliary cylinders. These cylinders are connected together and to the engine cylinder by passages and ports, so arranged that as the engine piston reaches approximately the end of its power stroke, gas is admitted to one auxiliary cylinder to act on the piston therein and open and exhaust port, which port remains open until the piston reaches approximately the end of its exhaust stroke. The gas is now admitted to the other auxiliary cylinder to act on the piston therein and open the inlet valve, which valve remains open during the suction or intake stroke. Other patents employing similar principles are Reissue U.S. Pat. No. 13,099, dated Apr. 5, 1910; U.S. Pat. No. 634,509, dated Oct. 10, 1899; U.S. Pat. No. 1,323,445, dated Dec. 2, 1919; and U.S. Pat. No. 896,439, dated Aug. 18, 1908.

While the foregoing patents rely mainly on gas pressure differentials to open and close the inlet and exhaust valves to the cylinder, U.S. Pat. No. 1,289,058, dated Dec. 24, 1918, illustrates a valve system for a four-cycle internal combustion engine in which a direct mechanical connection is provided from the end of the piston to the end of the intake and exhaust valves for operating them without the necessity of a camshaft. The mechanical connection is such that on one downward stroke of the piston, the inlet valve is opened while the exhaust valve remains closed and on the next downward stroke of the piston, the exhaust valve is opened while the inlet valve remains closed.

Engine structures designed to operate without a crankshaft, per se, are not novel. But, the present invention discloses such an engine which operates on a four-cycle principle with an entirely different valve than those described heretofore, which results in superior performance characteristics.

SUMMARY OF THE INVENTION

The valve configuration or arrangement of the four-cycle internal combustion engine of the present invention enables twice the conventional charge to be forced into the cylinder before compression begins. The resulting compression ratio would thus be twice the conventional value. Increase of the compression ratio will increase the thermal efficiency and power output of a four-cycle internal combustion engine.

Further, the valve configuration employed in the present invention makes it possible to use the spent exhaust gases to reheat the new charge entering the cylinder. This in turn results again in enhancing the thermal efficiency of the engine.

Accordingly, the valve configuration of the present invention results in the economical elimination of the conventional camshaft and its associated gearing and a more powerful and efficient engine of the type without a camshaft which has been designed heretofore.

In order to accomplish the foregoing objective, each cylinder of the engine is provided with an inlet valve of conventional design, except that the valve stem is short, does not rest on any cam or arm, and ends in a disc that retains a valve spring.

The outlet valve has an annular shape and circumscribes a housing for the inlet valve. The valve stem of the outlet valve is tubular and ends in a piston. The piston of the outlet valve fits into an annular chamber below the top of the engine. The piston of the outlet valve is sealed against the walls of the cylinder and the housing of the inlet valve by piston rings. A spring is disposed about the outlet valve and is seated between a valve seat and the piston at the top of the outlet valve.

The outlet valve has ports connecting the space on both sides of the valve stem. Thus, the interior of the tubular, annular outlet valve stem is in communication with the space between it and the cylinder wall beneath the piston of the outlet valve. An outlet port is provided in the cylinder wall which in turn communicates with an exhaust or outlet passage of the engine structure.

The inlet valve is seated in a tubular housing which has a port in communication with the chamber in the cylinder above the outlet or exhaust valve. A port is also formed in the cylinder wall communicating with he chamber above the outlet valve. This port communicates with the inlet passage of the engine structure.

On the downstroke of the engine piston a reed valve is opened enabling communication between the space beneath the piston head and the inlet passage. Air is thus forced from beneath the piston head to the inlet passage and into the cylinder head and chamber above the outlet valve. The gas pressure in the chamber will force the inlet valve open against the bias of its spring. The gas pressure above the inlet valve in communication with the partial vacuum created in the cylinder head above the piston on its downstroke insures operation of the inlet valve to emit a fresh charge to the space above the engine piston head. Since the pressure on the piston of the outlet valve is reduced by the opening of the inlet valve, the bias of the spring circumscribing the annular outlet valve between the piston and its valve seat keeps the outlet valve closed.

On the subsequent upstroke or compression stroke of the piston, the charge is compressed in the engine cylinder. The admitting reed valve closes because of the pressure differential created by the vacuum beneath the piston head. A second reed valve on the other side of the piston rod is opened during the compression stroke admitting still another charge of outside air and fuel into the space beneath the engine piston. The pressure exerted on the charge above the piston head in the cylinder during the compression stroke also closes the inlet valve.

After ignition, the second downstroke of the cycle occurs, or what is commonly known as the power stroke. Again, the second reed valve is closed and the first reed valve on the other side of the piston rod is opened. A second charge is forced through the inlet passage into the chamber above the outlet or exhaust valve. Combustion pressure keeps both the inlet valve and the exhaust valve closed.

During the next part of the cycle, or the second upstroke of the piston, exhaust or the expulsion of the burnt charge occurs.

During the last part of the power stroke, a valve port leading to the exhaust passage of the engine is opened. The port is opened by a pressure valve with a valve spring resistance slightly in excess of 2 atu. The port opens into an exhaust passage which is also in communication with the chamber beneath the piston of the exhaust valve and the ports in the annular wall of the tubular exhaust valve. The pressure valve makes it possible for the pressure in the cylinder to drop during the last part of the power stroke sufficiently for the gas pressure in the chamber above the piston of the exhaust valve to force the exhaust valve open against the bias of its spring retainer.

The opening of the exhaust valve allows the burnt charge to flow into the space beneath the piston of the valve and through the port in the cylinder wall communicating with the main exhaust passage. The residual pressure within the cylinder generated by the upstroke of the piston during the scavenging part of the cycle will keep the inlet valve closed. Since the pressure in the chamber above the exhaust valve will remain constant during the scavenging part of the cycle, the exhaust valve will remain open during the upstroke of the piston during the last part of the cycle.

Following the scavenging stroke of the piston, the cycle begins to repeat. Upon the subsequent downstroke of the piston, the partial vacuum in the cylinder again allows the inlet valve to open to emit a new charge from the air chamber over the cylinder. The drop of gas pressure on the outlet valve piston then allows the spring to close the outlet valve. This charge is twice the conventional value since during the preceding compression stroke an equal amount of air/fuel mixture was drawn into the space beneath the engine piston head, than had been there initially. Accordingly, on the subsequent compression stroke, approximately twice the conventional charge is in the cylinder before compression begins.

Furthermore, the exhaust passage is so arranged to surround the chamber above the exhaust valve whereby the burnt exhaust gases will reheat the new charge entering the cylinder through the inlet valve. The higher temperature of the incoming mixture will enable the engine to operate more efficiently.

Other advantages and objects of this invention will become more apparent from the following detailed description and claims and from the accompanying drawings wherein:

DESCRIPTION OF THE PREFERRED EMBODIMENT

Figure 1:
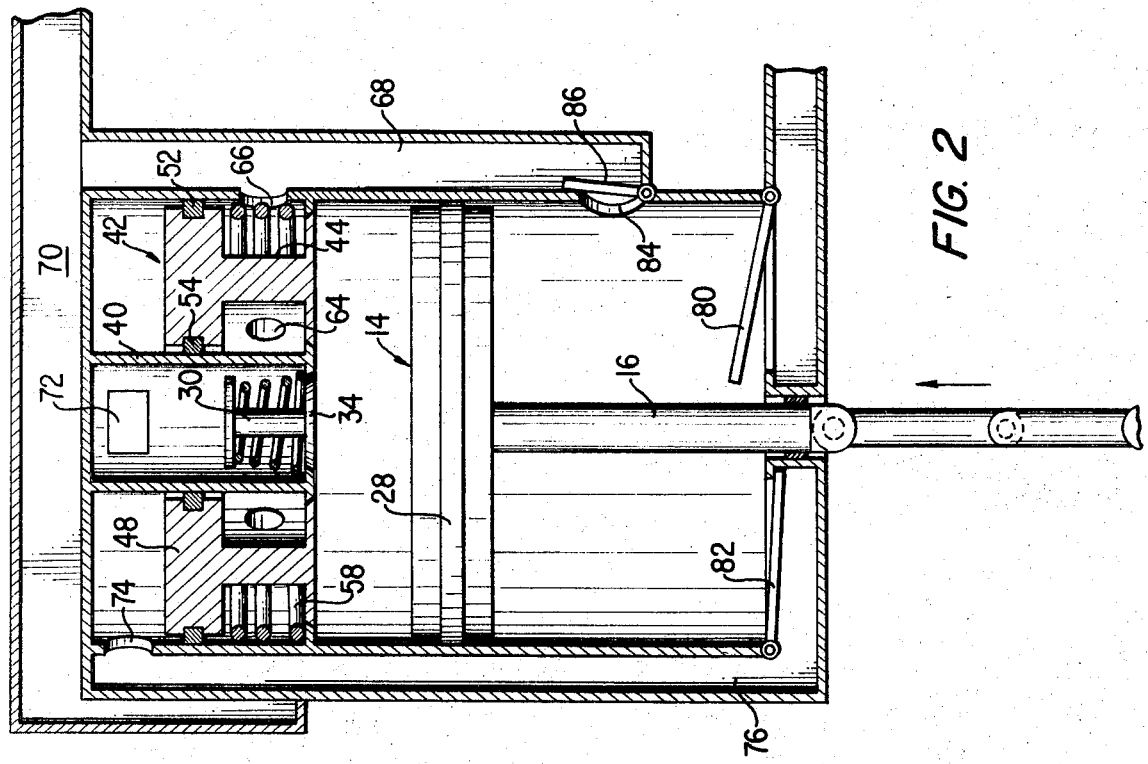
FIG. 1 is a diagrammatic view, partly in section, through a cylinder of the internal combustion engine of the present invention, and further illustrating the position of the various elements in the cylinder during the intake stroke of the cycle.

Referring now to the drawings in detail, wherein like numerals indicate like parts throughout the several views, a typical structural unit of the proposed engine is illustrated in FIG. 1 by the reference numeral 10. FIG. 1 is diagrammatic for purposes of illustrating the principles of the present invention and the cylinder is shown without a spark plug; it being understood that conventional elements would perform in a manner well understood by those skilled in the art.

The cylinder structure includes a main cylinder 12 slideably housing an engine piston 14. Piston 14 has a piston rod 16 which extends downwardly through the closed bottom of cylinder 12 through a gas-tight seal 18 and is connected by a cross head 20 to a connecting rod 22. Connecting rod 22 is joined to a crankshaft 24 by a bearing 26. A piston ring 28 is embedded annularly in the piston head 14 and is disposed in wiping contact with the walls of main cylinder 12.

Figure 2:
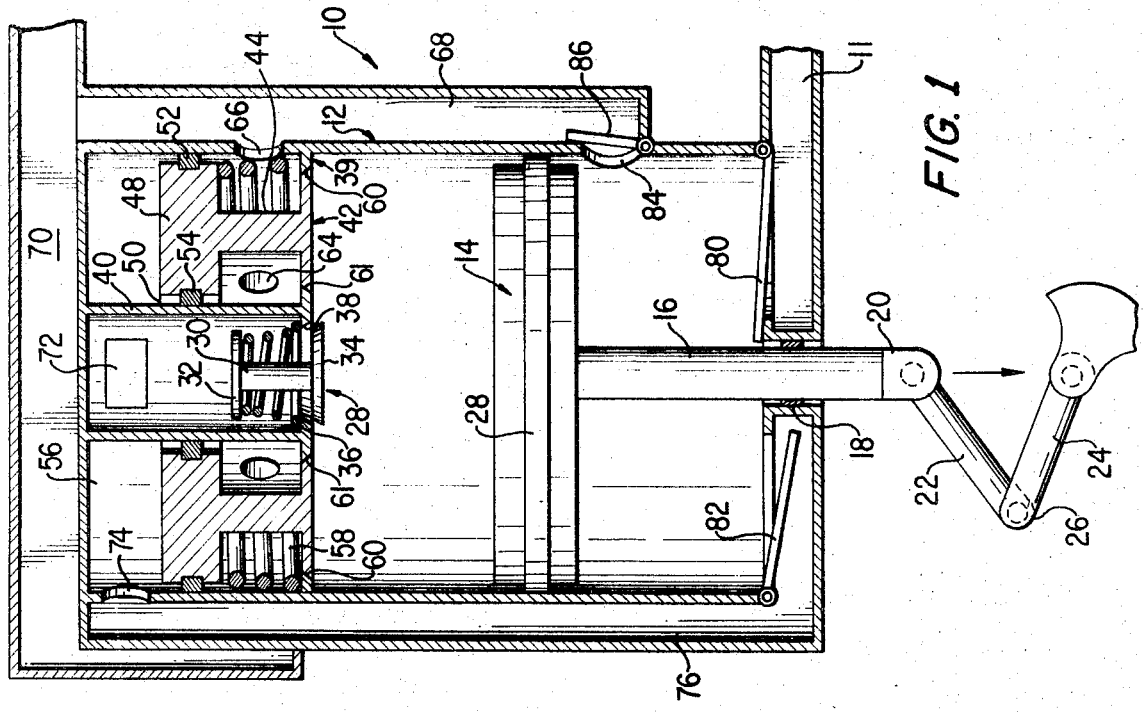
FIG. 2 is a view similar to FIG. 1, but illustrating the position of the various elements within the cylinder during the compression stroke of the cycle.
Figure 3:
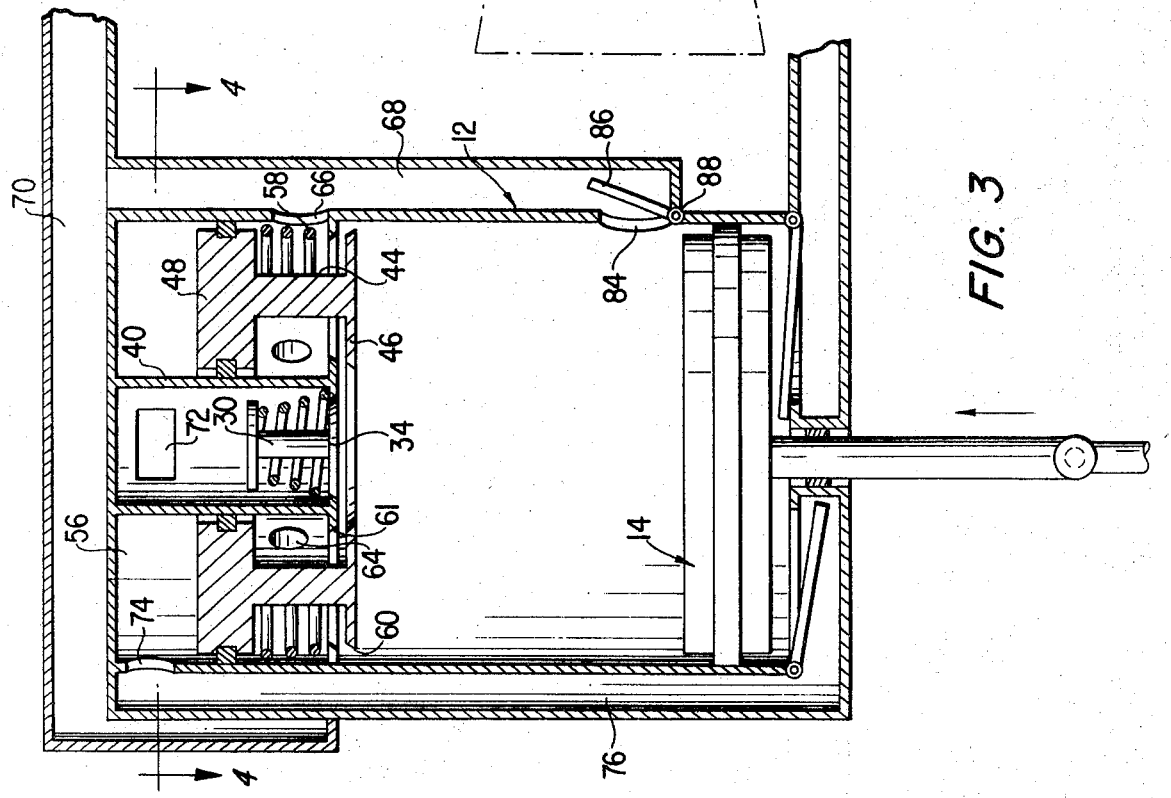
FIG. 3 is a view similar to FIGS. 1 and 2, but illustrating the position of the various elements in the cylinder at the end of the power stroke of the cycle.

The proposed engine has an inlet valve 28 of substantially conventional design, except that its valve stem 30 is short and does not rest on any cam or arm nor does it require such a mechanism to ensure its proper opening and closing. Valve stem 30 depends from a circular head 32 and terminates in circular disc 34. A coil spring 36 is held captive under compression between disc 32 and valve seat 38 of the inlet valve 28 and normally urges disc 34 towards a closed position (as shown in FIGS. 2 and 3) on an annular valve seat 38 formed in the central portion of a ring 39 integral with the housing 40 of valve 28.

An annular exhaust valve 42 is provided having a tubular valve stem 44 which terminates in an annular valve head 46. The other end of valve stem 44 terminates in an annular piston. Piston 48 has a central circular bore 50 which circumscribes a tubular housing 40 integral with and depending from the top wall of structure 10. Tubular housing 40 is integral with ring 39 and houses inlet valve 28.

Piston 48 is sealed by annular piston rings 52 and 54 against the walls of structure 10 and tubular housing 40, respectively. The top of piston 48 and the top wall of the engine structure 10 form a gas chamber 56.

A valve spring 58 fits between piston 48 and annular valve seat 60, integral with the top of cylinder 12 and normally biases exhaust valve 42 to a closed position as shown in FIG. 1, with the outer and inner edges of annular disc 46 against valve seats 60 and 61.

Tubular valve stem 44 has a number of ports 64 connecting the space in the interior of the exhaust valve 42 with the space between stem 44 and the wall of structure 10. On its other side, the aforesaid space communicates through an outlet port 66 with exhaust passages 68 and 70 formed in cylinder structure 10. The interior of housing 40 is open and in communication with chamber 56 through ports 72 formed in its wall. A port 74 formed in a wall of engine structure 10 establishes communication between gas chamber 56 and an inlet passage 76.

On the initial downstroke of the piston 14 during the intake stroke of the cycle, a reed valve 80 is pushed closed by the pressure beneath the piston head 14. Simultaneously, a reed valve 82 is opened to establish communication between the space beneath the piston head 14 and gas chamber 56 through inlet passage 76 and port 74. The increase in air pressure in chamber 56 will increase the gas pressure on inlet valve 28 through port 72, and this pressure in combination with the partial vacuum created in main cylinder 12 beneath inlet valve 28 by virtue of movement of piston 14 will force the valve 28 open against the bias of valve spring 36. A fresh charge thus enters the space above piston 14 during the initial downstroke of piston 14. Since the pressure in chamber 56 above piston 48 of exhaust valve 42 is reduced by the opening of valve 28, valve spring 58 retains exhaust valve 42 closed.

On the subsequent upstroke of piston 14 or during the compression of the charge above piston 14, reed valve 82 is pulled closed by the suction created by the upsurge of the piston 14 and reed valve 80 is opened admitting another charge of fuel and air into the space beneath piston head 14 through an inlet passage 11. The pressure exerted on the charge above piston 14 closes inlet valve 28 as shown in FIG. 2.

After ignition, the second downstroke of piston 14 of the power cycle occurs. Again, reed valve 80 is closed and reed valve 82 is opened and a fresh charge is forced through passage 76 into pressure chamber 56. Combustion pressure keeps both inlet valve 28 and exhaust valve 42 closed.

When piston 14 has reached its lowermost point during the power stroke and starts up again during the final part of the cycle or the second upstroke of piston 14, it will expel the burnt charge. During the last part of the power stroke, a valve port 84 is exposed permitting communication with the space in cylinder 12 above piston 14 and exhaust passage 68. Port 84 is normally closed by a pressure valve 86 which has a valve spring 88 whose resistance is slightly in excess of 2 atu. The opening of valve 86 during the last part of the power stroke makes it possible for the pressure in main cylinder 12 to drop sufficiently for the gas pressure in chamber 56 acting on piston 48 to overcome the bias of spring 58 maintaining valve 42 closed, thus allowing valve 42 to open. Inlet valve 28, subject to the same pressure in chamber 56, stays closed because piston 48 offers a larger surface to the pressure than disc 34. The opening of valve 42 allows the burnt charge to flow partly through ports 64 and partly directly into exhaust passage 68 through port 66. The residual pressure within the cylinder 12 generated by the upstroke of piston 14 during the scavenging part of the cycle wil keep intake valve 28 closed. Since the pressure in chamber 56 will remain substantially constant during the scavenging cycle, exhaust valve 42 will remain open during the second upstroke of piston 14.

Upon the subsequent downstroke of piston 14, the cycle recommences and the partial vacuum created in the main cyclinder 12 in combination with the increased pressure in chamber 56 allows intake valve 28 to open. The pressure on piston 48 being relieved, exhaust valve 42 will close. The resistance of spring 58 should be below 2 atu times volume of space beneath piston 14 at its uppermost point divided by volume of chamber 56 since the pressure in chamber 56 will not exceed 2 atu times volume of space beneath piston 14 at its uppermost point divided by volume of chamber 56 and the spring resistance in exhaust valve 42 must be below that value. The bias of spring 58 must be less than the pressure exerted on piston 48 minus the pressure exerted on valve head 46 after pressure valve 86 has opened.

From the foregoing description it should be understood that twice the conventional charge is forced into main cylinder 12 before compression begins. That is, during the power stroke of the cycle, the charge beneath piston head 14 admitted through reed valve 80 during the compression stroke is forced through reed valve 82 through intake passage 76, into chamber 56 and through ports 72 into housing 40. During the scavenging or exhaust portion of the cycle, a second charge is admitted into main cylinder 12 beneath piston head 14 from inlet passage 11 past reed valve 80 and then forced through passage 76, past reed valve 82 and through port 74 into chamber 56, on the downstroke of piston 14. This double charge is admitted through intake valve 28 into the space of main cylinder 12 above piston 14 when intake valve 28 is opened upon the first downstroke of piston 14 during the intake stroke of the cycle. Thus, if conventional chambering and stroking is used, the resultant compression ratio will be twice the conventional value. Twice the compression ratio will lead to a greater thermal efficiency and power output of the engine during operation with less piston displacement.

Furthermore, the existence of gas chamber 56 makes it possible to use the spent exhaust gases, which are directed to enter a passage 70 from exhaust passage 68, to reheat the fresh charge entering chamber 56. Passage 70 surrounds chamber 56. Obstructions in passage 70 will increase heat transfer to the gas in chamber 56 by compressing the exhaust gas and raising its temperature. Although this will require additional work by piston 14 on its scavenging stroke, the exhaust gases will contain less waste heat when leaving the engine. This also results in greater thermal efficiency of the engine.

Figure 6:
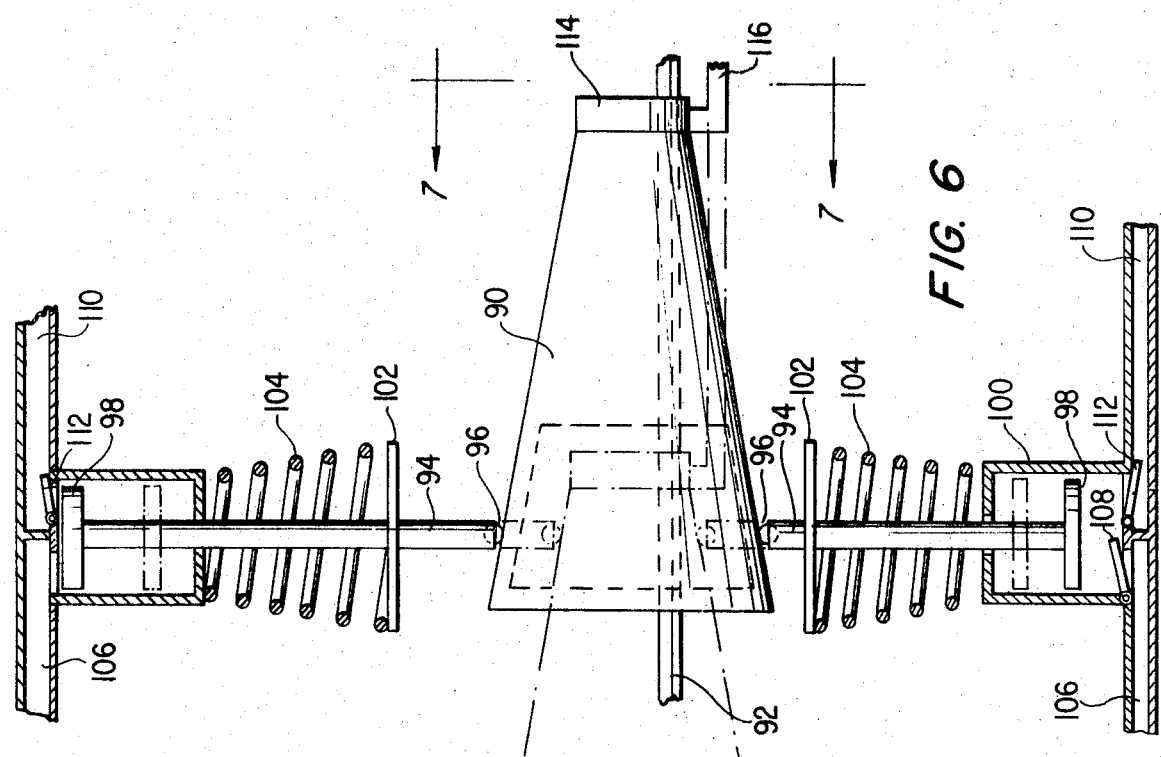
FIG. 6 is a diagramatic view, partly in section, of a pump which can be used for fuel injection purposes with the engine of the present invention if it is operated at a compression-ignition engine rather than a spark-ignition engine.
Figure 7:
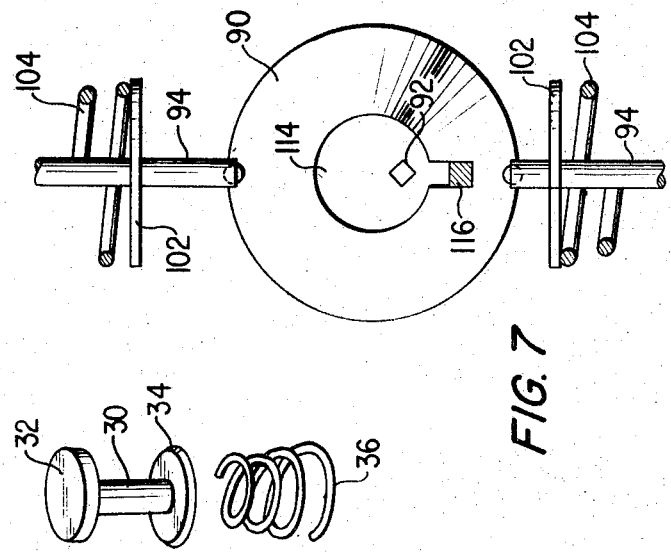
FIG. 7 is a cross-sectional view, taken substantially along the plane indicated by line 7 — 7 of FIG. 6.
Figure 5:
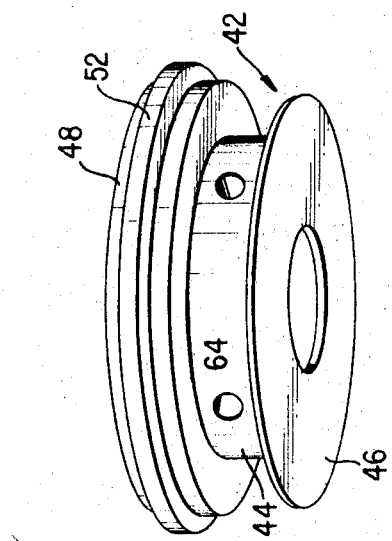
FIG. 5 is an exploded perspective view of certain elements of the valve structures employed in the cylinder of the engine of the present invention.
Figure 4:
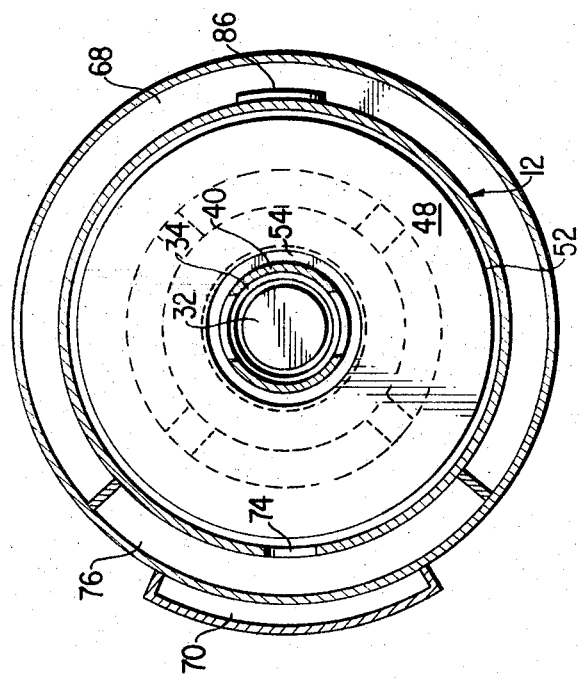
FIG. 4 is a cross-section view taken substantially along the plane indicated by line 4 — 4 of FIG. 3.

While the operation of the engine has thus far been described as being of the spark-ignition type, it should be understood that it can work on the compression-ignition principle. In the latter instance, a fuel-injection pump must be provided, to inject fuel into the cylinder at the right moment during the compression stroke. FIGS. 6 and 7 show such a pump designed for a continuously variable output.

A conical, eccentric cam 90 rotates with a square shaft 92 and can slide on the shaft as shown in phantom lines in FIG. 6. As many pump plunger rods 94 as there are engine cylinders rest on cam 90 by means of a ball 96 partly housed in the end of each rod 90.

Each plunger rod 94 has a piston 98 on one end slidable within a fuel cylinder 100. A disc 102 is attached to the other end of plunger rod 94. A compressed coil spring 104 is held captive about each plunger rod 94 between disc 102 and cylinder 100 and urges plunger rod 94 towards cam 90.

Fuel is admitted into each cylinder 100 through fuel inlet conduit 106 past a reed valve 108 and to be injected into the engine through conduit 110 past a reed valve 112.

During rotation of cam 90, the eccentric action forces one plunger rod 94 downwardly through cylinder 100 towards its valves 108 and 112 against the bias of spring 104, forcing fuel from the cylinder 100 through valve 112 into conduit 110. Simultaneously, valve 108 is closed. Meanwhile, an opposite plunger rod 94 is allowed to move away from valves 108 and 112 in its fuel cylinder under the urging of spring 104, pulling valve 108 open and closing its valve 112, thereby admitting fuel into its cylinder 100 through conduit 106.

Further, rotation of cam 90 reverses the direction of travel of the plunger rods 94, providing a continuous fuel output to the engine from the alternating conduits 110.

A ring 114 sliding in a groove on cam 90 connects with a control lever 116, by means of which cam 90 can be slid laterally on shaft 92. The position of the cam 90 relative to plungers 94, will determine the amount of reciprocal movement imparted to each plunger and hence the amount of fuel delivered to the engine through conduits 110.

The pump can have as many fuel cylinders 100 as necessary, annularly arranged in a radial arrangement in ratio of one for every engine cylinder.

In the compression-ignition type engine, if fuel injection is timed to take place when compression is just about completed, it would make the electrical components of the engine superfluous, substituting the fuel-injection pump for both a carburetor and electrical system, which might lead to savings, especially in small engines. For initial ignition, when the fresh charge cannot be reheated by the exhaust gas, a battery operated glow plug and/or a catalyst, such as a platinum alloy sputtered on both the piston head and the valves and valve seats might serve. The glow plug can be operated by a dry cell battery.

While the present invention discloses an engine design which will result in a substantial increase in compression ratio without increasing piston displacement, both resulting in increased power output and thermal efficiency of the engine, care must be taken to prevent knock and pre-ignition of the fuel charge. Any time that there is an increase in mixture temperature and pressure, the intensity of detonation of the mixture, or knock, in the engine becomes a factor. Yet, there are well known criteria to those skilled in the art for controlling knock even in high compression engines.

In theory it has been generally accepted that knock is caused by the auto ignition of the end gases. According to this theory, after the charge is ignited, a flame front travels somewhat radially through the combustion chamber, raising the temperature of the unburnt gases by adiabatic compression due to the expansion of the burning gases behind the flame front. Since the temperature of the unburnt gases is well above their auto ignition temperature, they burn with an explosive reaction. The violent combustion of this last part of the charge sets up a pressure differential in the cylinder which results in knock.

There are many actors which affect the knocking, or detonating, characteristics of an engine. In designing an engine, each of these characteristics may be taken into consideration and it is a matter of simple experimentation by those skilled in the art to achieve the most optimum working conditions.

For example, the effect of the fuel on detonation depends wholly upon its octane number; the higher the octane number, the less detonation.

Higher cylinder pressure will also cause an increase in the intensity of detonation. As the pressure increases, the temperature of the mixture rises and the speed of the reaction may be increased of both a thermal effect and a chain-branching effect. Also, an increase in pressure will lower the auto ignition temperature of the fuel, and the chain reaction path followed during the combustion reaction may be changed at the high pressures.

The temperature and pressure of the burning mixture are both influenced by the air-fuel ratio and will have their peak values with the most powerful mixture, which is a slightly rich mixture. Either richer or leaner mixtures will be slower burning, and thus causes a decrease in temperature and pressure, and, therefore, will lower the intensity of detonation.

A decrease of engine load at a given speed, will also cause a decrease in both the compression temperature and pressure.

Ignition timing also affects the mixture temperature and pressure. Advancing the ignition timing causes an increase in both the temperature and pressure because more of the mixture is burnt before top dead center, which increases peak temperatures and pressures. The power output, however, reaches an optimum at an intermediate spark advance.

The temperature of the end gas, or the last of the unburnt mixture, is dependent upon the rate of burning. When the rate of burning is slow, the end gases have more time to absorb heat from hot surfaces and radiation from the approaching flame front. One of the chief factors in promoting fast burning is turbulence. Turbulence tends to break up a slow-moving, uniform flame front, by carrying the flame quickly through the combustion chamber to the unburnt mixture. The shorter the time required for the completion of combustion, the less the tendency for detonation. Therefore, I propose that the upper surface of piston 14 form a segment of a hollow sphere — a configuration promoting turbulence — during compression. An increase in engine speed will cause a proportional increase in turbulence with a resulting proportional decrease in the time required for flame front travel cross the combustion chamber. The resultant decrease in combustion time causes lower temperatures to exist in the end gases and a corresponding reduction in detonation tendency at higher engine speeds.

When a spark plug is located in the position which will result in the lowest temperature of the end gases, there also will be the least tendency for detonation to occur. The shape and size of the combustion chamber also have a decided effect on detonation intensity. The size influences the distance the flame front must travel, while the distance and the degree of turbulence are dependent upon the shape of the combustion chamber.

An increased temperature of the already heated air charge also could promote a more complete burning of the fuel. The exhaust will thus contain less carbon monoxide and unburnt or only partly oxidized fuel residues.

In a final engine design, all of these factors must be taken into consideration.

What is claimed is:

1. In a four-cycle internal combustion engine having at least one cylinder, a piston reciprocable within said cylinder and defining a chamber above said piston and within said cylinder undergoing the intake, compression, power, and exhaust strokes, and a valve configuration designed to operate without a camshaft,
   a first chamber upstream from and adapted to communicate with the space within said cylinder beneath said piston for conducting a fresh charge of an air and fuel mixture to said cylinder and into the space beneath said piston,
   a second chamber downstream from and adapted to communicate with the space within said cylinder beneath said piston,
   first reed valve means between said upstream chamber and space in said cylinder beneath said piston operable in response to differential in gas pressures in said downstream chamber and cylinder below said piston during the compression and exhaust strokes of the operating cycle of said engine for admitting a fresh charge of said fuel and air mixture into said cylinder below said piston during the compression and exhaust strokes of the operating cycle of said engine,
   second reed valve means between said downstream chamber and space in said cylinder beneath said piston operable in response to the differential in gas pressures in said cylinder below said piston and downstream chamber during the intake and power strokes of the operating cycle of said engine for transferring the fresh charge of said fuel and air mixture introduced into the space in said cylinder beneath said piston during the compression and exhaust strokes of the operating cycle of said engine into said downstream chamber during the intake and power strokes of the operating cycle of said engine,
   inlet valve means in said cylinder above said piston in communication with said downstream chamber operative in response to a first gas pressure differential between said downstream chamber and cylinder above said piston during the intake stroke of the operating cycle of said engine for admitting the fresh charge of air and fuel mixture introduced into said downstream chamber during the previous intake and power strokes of the operating cycle of said engine into said cylinder above said piston,
   outlet valve means in said cylinder above said piston in communication with said downstream chamber operative in response to a second gas pressure differential between said downstream chamber and cylinder above said piston during the exhaust stroke of the operating cycle of said engine for expelling a burnt charge from said cylinder above said piston,
   an exhaust passage in communication with said outlet valve means for receiving said burnt charge expelled from said cylinder, and
   a normally closed pressure valve means between said exhaust passage and cylinder adapted to open in response to the pressure in said cylinder at the conclusion of the power stroke of said piston for relieving the gas pressure within said cylinder sufficiently to enable said second gas pressure differential in said downstream chamber to open said outlet valve means in preparation for the scavenging stroke of the engine cycle.

2. In a four-cycle internal combustion engine in accordance with claim 1
   said inlet valve means including
   a tubular inlet valve housing having a bottom in said cylinder above said piston,
   an inlet valve disposed within said tubular valve housing,
   said downstream chamber being in communication with the space in said cylinder above said piston through the interior of said tubular valve housing, and
   first spring means for normally retaining said inlet valve against the bottom of said tubular housing to prevent communication between said downstream chamber and the space in said cylinder above said piston until the bias of said first spring means is overcome by said first pressure differential between said downstream chamber and cylinder above said piston during the intake stroke of the operating cycle of said engine, said outlet valve means including an annular exhaust valve having a tubular stem circumscribing said inlet valve housing, the top of said exhaust valve also being in communication with said upstream chamber, an exhaust valve seat in said cylinder above said piston, said exhaust passage being in communication with the space in said cylinder above said piston, and second spring means for normally retaining said exhaust valve against said exhaust valve seat thereby preventing communication between said exhaust passage and the space in said cylinder above said piston until the bias of said second spring means is overcome by said second gas pressure differential between said downstream chamber and cylinder above said piston during the exhaust stroke of the operating cycle of said engine.

3. In a four-cycle internal combustion engine in accordance with claim 1 wherein said exhaust passage surrounds a portion of said downstream chamber whereby the burnt charge expelled from said cylinder is directed into heat exchange relation with said fresh charge prior to introduction of said fresh charge into said cylinder.

4. In a four-cycle internal combustion engine in accordance with claim 3 a variable, continuous output fuel injection pump including an axially slidable conical, eccentrically rotating cam means, a reciprocably mounted plunger rod riding on opposite sides of said cam means terminating in a piston, a fuel cylinder housing each piston, a fuel line in communication with each fuel cylinder, and valve means between each fuel cylinder and fuel line for admitting fuel from said fuel line into each fuel cylinder when its plunger rod and piston moves towards the axis of said eccentric cam means and for dispensing fuel into said fuel line from said fuel cylinder when its plunger rod and piston moves away from the axis of said eccentric cam means, the axial position of said conical eccentric cam means relative to said plunger rods controlling the linear displacement of each plunger rod and piston to vary the fuel dispensed into said fuel line.

5. In a four-cycle internal combustion engine in accordance with claim 2 said exhaust passage surrounding a portion of said downstream chamber whereby the burnt charge expelled by said cylinder is directed into heat exchange relation with a fresh charge prior to introduction of said fresh charge into said cylinder.

* * * * *